(12) United States Patent
Rav-Hon et al.

(10) Patent No.: US 11,126,472 B2
(45) Date of Patent: Sep. 21, 2021

(54) SYSTEM AND METHOD FOR MANAGING SHARED COMPUTER RESOURCES

(71) Applicant: LogsHero Ltd., Tel-Aviv (IL)

(72) Inventors: Roi Rav-Hon, Tel-Aviv (IL); Ianir Ideses, RaAnana (IL); Ziv Segal, RaAnana (IL)

(73) Assignee: LogsHero Ltd., Tel-Aviv (IL)

( * ) Notice: Subject to any disclaimer, the term of this patent is extended or adjusted under 35 U.S.C. 154(b) by 155 days.

(21) Appl. No.: 16/431,749

(22) Filed: Jun. 5, 2019

(65) Prior Publication Data

US 2020/0387407 A1 Dec. 10, 2020

(51) Int. Cl.
*G06F 9/50* (2006.01)
*G06F 9/48* (2006.01)
*H04L 29/08* (2006.01)

(52) U.S. Cl.
CPC .......... *G06F 9/5083* (2013.01); *G06F 9/4843* (2013.01); *G06F 9/5016* (2013.01); *H04L 67/1031* (2013.01)

(58) Field of Classification Search
CPC .... G06F 9/5083; G06F 9/5016; G06F 9/4843; H04L 67/1031
See application file for complete search history.

(56) References Cited

U.S. PATENT DOCUMENTS

| | | | |
|---|---|---|---|
| 7,613,848 B2 * | 11/2009 | Amini | H04L 29/06027 370/229 |
| 8,514,855 B1 * | 8/2013 | Robertson | H04L 49/3063 370/389 |
| 9,996,561 B1 * | 6/2018 | Barsness | G06F 16/21 |
| 2013/0219405 A1 | 8/2013 | Lee et al. | |
| 2015/0081879 A1 * | 3/2015 | Branson | H04L 45/24 709/224 |
| 2016/0344784 A1 | 11/2016 | Cao et al. | |
| 2017/0046401 A1 * | 2/2017 | Schenk | G06F 16/9535 |

(Continued)

OTHER PUBLICATIONS

Xhafa et al. "Processing and Analytics of Big Data Streams with Yahoo!S4" IEEE 29th International Conference. Retrieved on Dec. 31, 2020 from <https://ieeexplore.ieee.org/document/7097979/ > (Year: 2015).*

(Continued)

*Primary Examiner* — Brian J. Gillis
*Assistant Examiner* — Juan C Turriate Gastulo

(57) ABSTRACT

A system for managing a plurality of shared computer resources, comprising at least one hardware processor adapted for: in at least one of a plurality of management iterations: computing statistical values each associated with one of a plurality of streams, where the streams are input to a plurality of computing processes which are used for processing the plurality of streams, executed using at least one of a plurality of shared computer resources; identifying according to an analysis of the statistical values at least one obstructing stream; allocating at least one new shared computer resource; creating a plurality of new computing processes which execute using the at least one new shared computer resource; and instructing inputting the at least one obstructing stream to the plurality of new computing processes instead of to the plurality of computing processes while the plurality of streams are inputted to the plurality of computing processes.

22 Claims, 10 Drawing Sheets

(56) References Cited

U.S. PATENT DOCUMENTS

2017/0063724 A1* 3/2017 Cao .................. G06F 16/24568
2017/0091285 A1* 3/2017 Cao .................. G06F 16/24568
2020/0106833 A1* 4/2020 Konik ................ H04L 67/1097

OTHER PUBLICATIONS

European Search Report and the European Search Opinion dated Oct. 27, 2020 From the European Patent Office Re. Application No. 20178112.7. (13 Pages).
Xhafa et al. "Processing and Analytics of Big Data Streams With Yahoo!S4", 2015 IEEE 29th International Conference on Advanced Information Networking and Applications, XP032771919, Gwangiu, South Korea, Mar. 24-27, 2015, p. 263-270, Mar. 24, 2015.

* cited by examiner

SYSTEM AND METHOD FOR MANAGING SHARED COMPUTER RESOURCES

BACKGROUND

The present invention, in some embodiments thereof, relates to a system for processing a plurality of streams of data and, more specifically, but not exclusively, to a system for providing software as a service (SaaS).

A hosted service is a computer based service offered to one or more consumers by a provider that hosts one or more hardware processors executing one or more applications providing the computer based service, where the one or more hardware processors are located remote to locations of the one or more consumers. As used herein, the term "cloud computing" refers to delivering one or more hosted services, often over the Internet. A cloud based system is a computer system offering a hosted service. Some hosted services are software services, each hosted by a provider and made available to one or more consumers over the Internet. In a cloud based system that provides software as a service (SaaS), a software service is managed by the provider, and a consumer of the software service consumes the service as a utility, in a pay-as-you-go model.

In a cloud based system, the provider may allow more than one consumer to access one software instance of the software service. The term "tenant" refers to a group of users who share a common access to a software instance. A multi-tenant SaaS architecture is a computer software architecture where one software instance, executed by one or more hardware processors, serves multiple tenants while providing each of the multiple tenants with its own data.

The term "elasticity" in cloud computing refers to a capability of a cloud based system to dynamically adapt its capacity to meet varying workload. The term "provisioning" in cloud computing refers to making one or more shared computer resources available to one or more consumers of a service provided by a cloud based system. Some examples of a shared computer resource are a hardware processor, a virtual machine, a transient digital memory and a non-transient digital storage. Currently a common practice to achieve elasticity is by dynamically provisioning and de-provisioning, in an autonomous manner, one or more shared computer resources to match an amount of allocated computer resources with an actual amount of computer resources needed at any given point in time.

SUMMARY

It is an object of the present invention to provide a system and a method for managing a plurality of shared computer resources for processing a plurality of streams of data.

The foregoing and other objects are achieved by the features of the independent claims. Further implementation forms are apparent from the dependent claims, the description and the figures.

According to a first aspect of the invention, a system for managing a plurality of shared computer resources comprises at least one hardware processor adapted for: in at least one of a plurality of management iterations: computing a plurality of statistical values each associated with one of a plurality of streams, where the streams are input to a plurality of computing processes which are used for processing the plurality of streams, executed using at least one of a plurality of shared computer resources; identifying according to an analysis of the plurality of statistical values at least one obstructing stream among the plurality of streams; allocating at least one new shared computer resource to process the at least one obstructing stream; creating a plurality of new computing processes which execute using the at least one new shared computer resource; and instructing inputting the at least one obstructing stream to the plurality of new computing processes instead of to the plurality of computing processes while the plurality of streams are inputted to the plurality of computing processes.

According to a second aspect of the invention, a method for managing a plurality of shared computer resources comprises: in at least one of a plurality of management iterations: computing a plurality of statistical values each associated with one of a plurality of streams, where the streams are input to a plurality of computing processes which are used for processing the plurality of streams, executed by at least one hardware processor using at least one of a plurality of shared computer resources; identifying according to an analysis of the plurality of statistical values at least one obstructing stream among the plurality of streams; allocating at least one new shared computer resource to process the at least one obstructing stream; creating a plurality of new computing processes which execute on the at least one hardware processor using the at least one new shared computer resource; and instructing inputting the at least one obstructing stream to the plurality of new computing processes instead of to the plurality of computing processes while the plurality of streams are inputted to the plurality of computing processes.

According to a third aspect of the invention, a system for processing a plurality of streams, each comprising a sequence of log entries, comprises at least one hardware processor adapted for: in each of a plurality of stream iterations: receiving at least one log entry of a stream of the plurality of streams; inputting the at least one log entry to a plurality of computing processes executed using a plurality of shared computer resources managed by in at least one of a plurality of management iterations: computing a plurality of statistical values each associated with one of the plurality of streams, where the streams are input to a plurality of computing processes which are used for processing the plurality of streams, executed by the at least one hardware processor using at least one of the plurality of shared computer resources; identifying according to an analysis of the plurality of statistical values at least one obstructing stream among the plurality of streams; allocating at least one new shared computer resource to process the at least one obstructing stream; creating a plurality of new computing processes which execute on the at least one hardware processor using the at least one new shared computer resource; and instructing inputting the at least one obstructing stream to the plurality of new computing processes instead of to the plurality of computing processes while the plurality of streams are inputted to the plurality of computing processes; and providing an output of the computing processes to at least one other hardware processor to perform a log-analysis task.

With reference to the first and second aspects, in a first possible implementation of the first and second aspects of the present invention at least one of the plurality of shared computer resources is selected from a group of computer resources consisting of: a virtual machine, digital memory, and a non-volatile digital storage. At least one of the new shared computer resources is selected from the group of computer resources. Optionally, at least one of the plurality of computing processes is executed by at least one virtual machine executing on at least one other hardware processor. Using a shared virtual machine, additionally or alternatively a shared digital memory and additionally or alternatively a shared non-volatile digital storage reduces cost of implementation and cost of operation of one or more services provided by one or more tenants sharing computer resources.

With reference to the first and second aspects, in a second possible implementation of the first and second aspects of the present invention each of the plurality of streams comprises a plurality of digital data objects, each digital data object comprising a plurality of values. Optionally, each of the plurality of streams comprises a plurality of log entries. Processing the plurality of streams comprises for each of the plurality of streams: in each of a plurality of stream iterations: receiving at least one digital data object of the respective stream; computing a plurality of object statistical values according to the at least one digital data object; computing at least one additional value according to the plurality of values of one or more of the at least one digital data object; and adding the at least one additional value to the one or more digital data objects. Optionally, processing the plurality of streams further comprises for each of the plurality of streams, in at least one of the plurality of stream iterations, providing the plurality of object statistical values to at least one other computing process to perform a data-analysis oriented task. Optionally, the at least one hardware processor is adapted to computing the plurality of statistical values using the plurality of object statistical values. Optionally, processing the plurality of streams further comprises for each of the plurality of streams, in each of the plurality of stream iterations, storing the at least one digital data object on at least one non-volatile digital storage connected to the at least one hardware processor. Storing the at least one digital data object on non-volatile digital storage facilitates deferring processing of the at least one digital data object, reducing data loss which may reduce availability of a service provided by a tenant using the plurality shared computer resources. Providing the plurality of object statistical values to at least one other computing process to perform a data-analysis oriented task facilitates identifying an obstructing stream and thus increases throughput and reduces data loss of at least one service provided by a tenant using the plurality of shared computer resources.

With reference to the first and second aspects, in a third possible implementation of the first and second aspects of the present invention the plurality of shared computer resources comprises at least one buffer, such that at least one acceptor process of the plurality of computing processes stores the plurality of streams in the at least one buffer, and at least one processing process of the plurality of computing processes reads the plurality of streams from the at least one buffer. The plurality of new shared computer resources comprises at least one new buffer, such that the at least one acceptor process stores the at least one obstructing stream in the at least one new buffer, and at least one new processing process of the plurality of new computing processes reads the at least one obstructing stream from the at least one new buffer. Using a new buffer to process an obstructing stream facilitates reducing data loss and thus increasing system reliability and reliability of at least one service provided by a tenant using the shared computer resources.

With reference to the first and second aspects, in a fourth possible implementation of the first and second aspects of the present invention the at least one hardware processor is further adapted for: in at least one other of the plurality of management iterations: identifying according to the analysis of the plurality of statistical values at least one other obstructing stream among the plurality of streams; and instructing inputting the at least one other obstructing stream to the plurality of new computing processes instead of to the plurality of computing processes while the plurality of streams are inputted to the plurality of computing processes. Optionally, the at least one hardware processor is further adapted for: in at least one other of the plurality of management iterations: identifying according to an analysis of the plurality of statistical values at least one other obstructing stream among the plurality of streams; allocating at least one other new shared computer resource to process the at least one other obstructing stream; creating a plurality of other new computing processes which execute using the at least one other new shared computer resource; and instructing inputting the at least one other obstructing stream to the plurality of other new computing processes instead of to the plurality of computing processes while the plurality of streams are inputted to the plurality of computing processes. Directing another obstructing stream to processing using the new plurality of computing resources reduces processing latency without further increasing an amount of computing resources needed to process the plurality of streams thus reducing cost of operation.

With reference to the first and second aspects, in a fifth possible implementation of the first and second aspects of the present invention the plurality of statistical values comprises a plurality of byte-rate values, each associated with one of the plurality of streams and indicative of an amount of bytes of the stream received by the at least one hardware processor in an identified time interval. Identifying according to the analysis of the plurality of statistical values at least one obstructing stream among the plurality of streams comprises: computing a plurality of rate-change values, each associated with one of the plurality of streams, by for each of the plurality of streams dividing the byte-rate value of the respective stream by a previous byte-rate value of the respective stream computed in a previous iteration of the plurality of management iterations; identifying at least one high rate-change value of the plurality of rate-change values, each greater than an identified rate-change threshold value; and identifying at least one stream of the plurality of streams, each associated with one of the at least one high rate-change value, as the at least one obstructing stream. Optionally, the at least one hardware processor is further adapted for: in at least one additional iteration of the plurality management iterations: computing at least one new rate-change value, each associated with one of the at least one obstructing stream, by for each of the at least one obstructing stream dividing the byte-rate value of the respective stream by another previous byte-rate value of the respective stream computed in another previous iteration of the plurality of management iterations; identifying at least one normal rate-change value of the at least one new rate-change value, each less than the identified rate-change threshold value; and instructing inputting the at least one obstructing stream to the plurality of computing processes instead of to the plurality of new computing processes while the plurality of streams are inputted to the plurality of computing processes. Using a plurality of average byte-rate values requires few computational resources to identify an obstructing stream thus reducing cost of operation and reducing latency of identifying an obstructing stream. Identifying a stream no longer having a high byte-rate facilitates reducing cost of operation by reducing an amount of shared computer resources required to process the plurality of streams.

With reference to the first and second aspects, in a sixth possible implementation of the first and second aspects of the present invention each of the plurality of streams comprises a plurality of digital data objects The plurality of statistical values comprises a plurality of processing-time values, each associated with one of the plurality of streams and indicative of an amount of time the plurality of computing processes execute to process a digital data object of the stream. Identifying according to the analysis of the plurality of statistical values at least one obstructing stream among the plurality of streams comprises: producing a plurality of average processing-time values, each associated with one of the plurality of streams, by for each of the plurality streams computing an average of some of the plurality of processing-time values, each associated with the respective stream; identifying at least one high average processing-time value of the plurality of average processing-time values, each greater than an identified processing-time threshold value; and identifying at least one stream of the plurality of streams, each associated with one of the at least one high average processing-time value, as the at least one obstructing stream. Optionally, the at least one hardware processor is further adapted for in each of a plurality of stream iterations: receiving at least one digital data object of the obstructing stream; marking the at least one digital data object as unprocessed; and storing the marked at least one digital data object in at least one non-volatile digital storage connected to the at least one hardware processor. Optionally, instructing inputting the at least one obstructing stream to the plurality of new computing processes comprises instructing the plurality of new computing processes to retrieve the marked at least one digital data objects from the at least one non-volatile digital storage. Optionally, the at least one hardware processor is further adapted for: in at least one additional iteration of the plurality management iterations: producing at least one new average processing-time value, each associated with one of the at least one obstructing stream, by for each of the at least one obstructing stream computing another average of some other of the plurality of processing-time values, each associated with the respective stream; identifying at least one normal average processing-time value of the at least one new average processing-time value, each less than the identified processing-time threshold value; and instructing inputting the at least one obstructing stream to the plurality of computing processes instead of to the plurality of new computing processes while the plurality of streams are inputted to the plurality of computing processes. Using a plurality of average processing-time values requires few computational resources to identify an obstructing stream thus reducing cost of operation and reducing latency of identifying an obstructing stream. Identifying a stream no longer having a high processing time facilitates reducing cost of operation by reducing an amount of shared computer resources required to process the plurality of streams. Marking a digital data object stored in non-volatile digital storage as unprocessed allows processing the digital data object at another time after marking the digital object, thus reducing an amount of shared computer resources required to process the plurality of streams without suffering data loss, and thus without impacting one or more services provided by a tenant using the plurality of shared computer resources.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
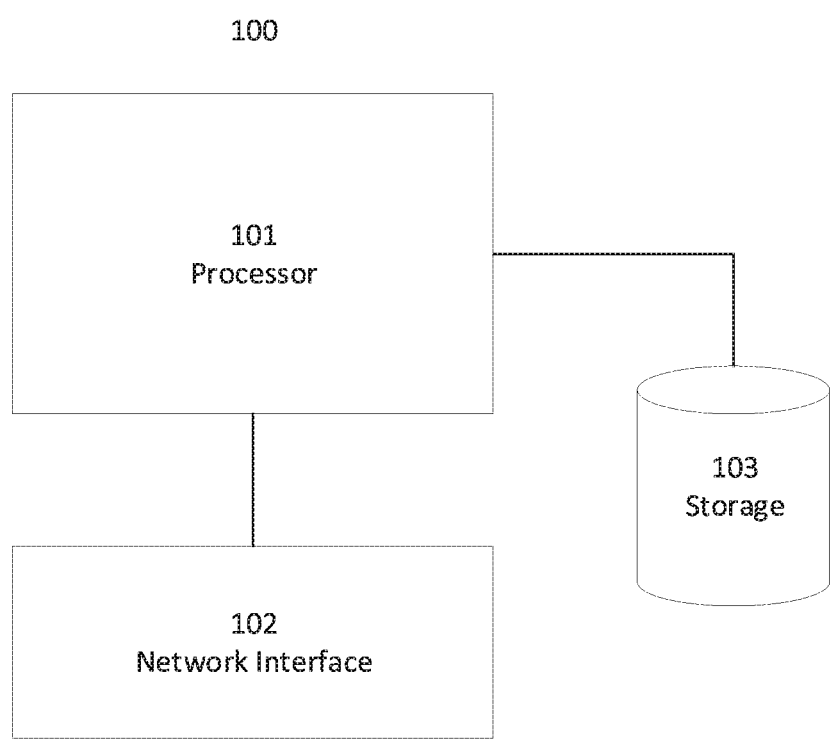
FIG. 1 is a schematic block diagram of an exemplary system, according to some embodiments of the present invention.

The present invention, in some embodiments thereof, relates to a system for processing a plurality of streams and, more specifically, but not exclusively, to a system for providing software as a service (SaaS).

When a computer system processes a plurality of streams of data, a sudden, and possibly transient, change in one of the streams might impact performance of processing some other streams of the plurality of streams of data. For example, a sudden increase in an amount of bytes of a stream of the plurality of streams of data in an identified amount of time may increase an amount of time required to process the increased amount of bytes and cause a delay in processing data from other streams of the plurality of streams of data. In another example, the increase in the amount of bytes may increase an amount of memory required to store data from the stream resulting in other data, from other streams, to be discarded. When the computer system is a multi-tenant system and the plurality of streams are received each from one of a plurality of tenants, a sudden (and transient) condition of one of the tenants might impact performance of processing some of the plurality of streams received from some other tenants of the plurality of tenants. For example, when a SaaS is for processing log entries, a burst of log entries received from one tenant (for example due to an error condition in the tenant's system) could significantly reduce throughput of processing other tenants' streams of log entries. In another example, a sudden, and perhaps temporary, increase in an amount of time required to process each log entry received in a stream of one tenant could significantly reduce throughput of processing other tenants' streams of log entries.

A service-level agreement (SLA) is a commitment between a service provider and a client, specifying one or more aspects of the service. Some examples of service aspects are availability and quality, such as throughput and latency. In a system providing a SaaS, a client may have one tenant or a plurality of tenants. In a system providing a service to a tenant according to an SLA, impact to throughput of processing a stream associated with the tenant may violate one or more terms of the SLA.

Dynamic elasticity of cloud based resources eventually solves such congestion issues by allocating new shared computer resources for processing the plurality of streams. For example, when the shared computer resources comprise one or more computing processes for processing the plurality of streams, dynamic elasticity may result in allocation and execution of at least one more computing process for processing the plurality of streams. However there is a latency (of at least several minutes) before elasticity increases the amount of shared computer resources. In addition, an elastic expansion usually requires significant increases in resources. One reason an elastic expansion requires significant increases in resources is that due to the latency in increasing the amount of shared computer resources current elastic expansion practices attempt to reduce the frequency of elastic expansions by allocating, upon detecting congestion, sufficient shared computer resources to accommodate some additional resource requirements beyond the congestion that triggered an elastic expansion, even though these shared computer resources may never be needed.

Instead of increasing a plurality of shared computer resources for processing the plurality of streams from the plurality of tenants, the present invention, in some embodiments thereof, proposes identifying in the plurality of streams an obstructing stream from a tenant and temporarily isolating processing of the obstructing stream from processing of other of the plurality of streams. According to some embodiments of the present invention, a plurality of statistical values is computed, where each of the plurality of statistical values is associated with one of the plurality of streams. In such embodiments, one or more obstructing streams are identified among the plurality of streams according to an analysis of the plurality of statistical values. An obstructing stream may be noisy, having an identified increase in an amount of bytes of the stream received by the system in an identified amount of time. Optionally, an obstructing stream is slow, such that an average processing-time value, indicative of an amount of time the system executes to process a digital data object of the obstructing stream, exceeds an identified processing-time threshold value. Optionally, an obstructive stream is both noisy and slow. In embodiments where a plurality of shared computer resources are used by a plurality of computing processes to process the plurality of streams, the present invention proposes allocating one or more new shared computer resources and creating one or more new computing processes, such that the one or more new computing processes execute using the one or more new shared computer resources to process the one or more obstructing streams while the plurality of computing processes process other streams of the plurality of streams using the plurality of shared computer resources. By diverting processing of an obstructing stream to one or more new computing processes using one or more new shared computer resources, other streams of the plurality of streams may be processed by the plurality of computing processes using the plurality of computer resources without suffering increased latency, reduced throughput or data loss. In addition, diverting processing of the obstructing stream according to the present invention requires fewer resources than cloud-base systems' dynamic elasticity as new shared computer resources, and additionally or alternatively new computing processes, may be allocated according to only the obstructing stream without anticipating future requirements for increased shared computer resources.

In addition, when an obstructing stream is slow, in some embodiments of the present invention one or more digital data objects of the obstructing stream are marked as unprocessed and stored in at least one non-volatile (i.e. non-transient) digital storage, for example a hard-disk, a network connected storage or a storage network. In such embodiments, inputting the obstructing stream to the one or more new computing processes comprises the one or more new computing processes retrieving the one or more digital data objects from the at least one non-volatile digital storage. For example, when the one or more digital data objects are one or more log entries and processing the one or more log entries comprises adding one or more values to each of the one or more log entries, the one or more log entries received from the tenant may be stored in the at least one non-volatile digital storage and processed at a time later than when the one or more log entries were received. Deferring processing of a slow obstructing stream allows reducing cost of operation to process the slow obstructing stream from the tenant without increasing latency of a service provided to another tenant, as the slow obstructing stream may be processed when there is less demand for the shared computer resources and thus fewer shared computer resources are needed than when processing all the plurality of streams simultaneously.

In addition, according to the present invention, when a stream identified as an obstructing stream ceases to be obstructing, the identified obstructing stream is input to the shared computer resources processing the other of the plurality of streams. The new shared computer resources may be deallocated and the new computing processes may be stopped. Returning a stream identified as an obstructing stream to be input to the plurality of computing processes instead of to the one or more new computing processes reduces cost of operation as fewer shared computer resources are needed than when shared computer resources are allocated for a worst-case scenario.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing an exemplary system 100, according to some embodiments of the present invention. In such embodiments, at least one hardware processor 101 is connected to at least one non-volatile digital storage 103. Some examples of a non-volatile digital storage are a hard disk, a network connected storage and a storage network. A hardware processor is typically, but not exclusively, a processor running suitable software for performing one or more data-analysis oriented tasks and additionally or alternatively for communicating with a plurality of tenants and for processing a plurality of streams of data received from the plurality of tenants. A hardware processor may comprise digital memory storage, for example random access memory (RAM). Optionally, a stream comprises one or more digital data objects. Optionally, a digital data object comprises a plurality of values. An example of a digital data object is a log entry. Another example of a digital data object is a physical measurement value, such as a temperature value or a wind velocity value.

For brevity, henceforth the term "processor" is used to mean "at least one hardware processor" and the terms are used interchangeably. Optionally, processor 101 stores one or more digital data objects of the plurality of stream in at least one non-volatile digital storage 103. Optionally, at least one other hardware processor (not shown) is connected to at least one non-volatile digital storage 103 and retrieves the one or more digital data objects stored on at least one non-volatile digital storage 103 for the purpose of processing the one or more digital data objects. Optionally, processor 101 is connected to one or more digital communication network interfaces 102, for the purpose of communicating with the at least one other hardware processor, and additionally or alternatively for the purpose of receiving the plurality of streams from the plurality of tenants.

Figure 2:
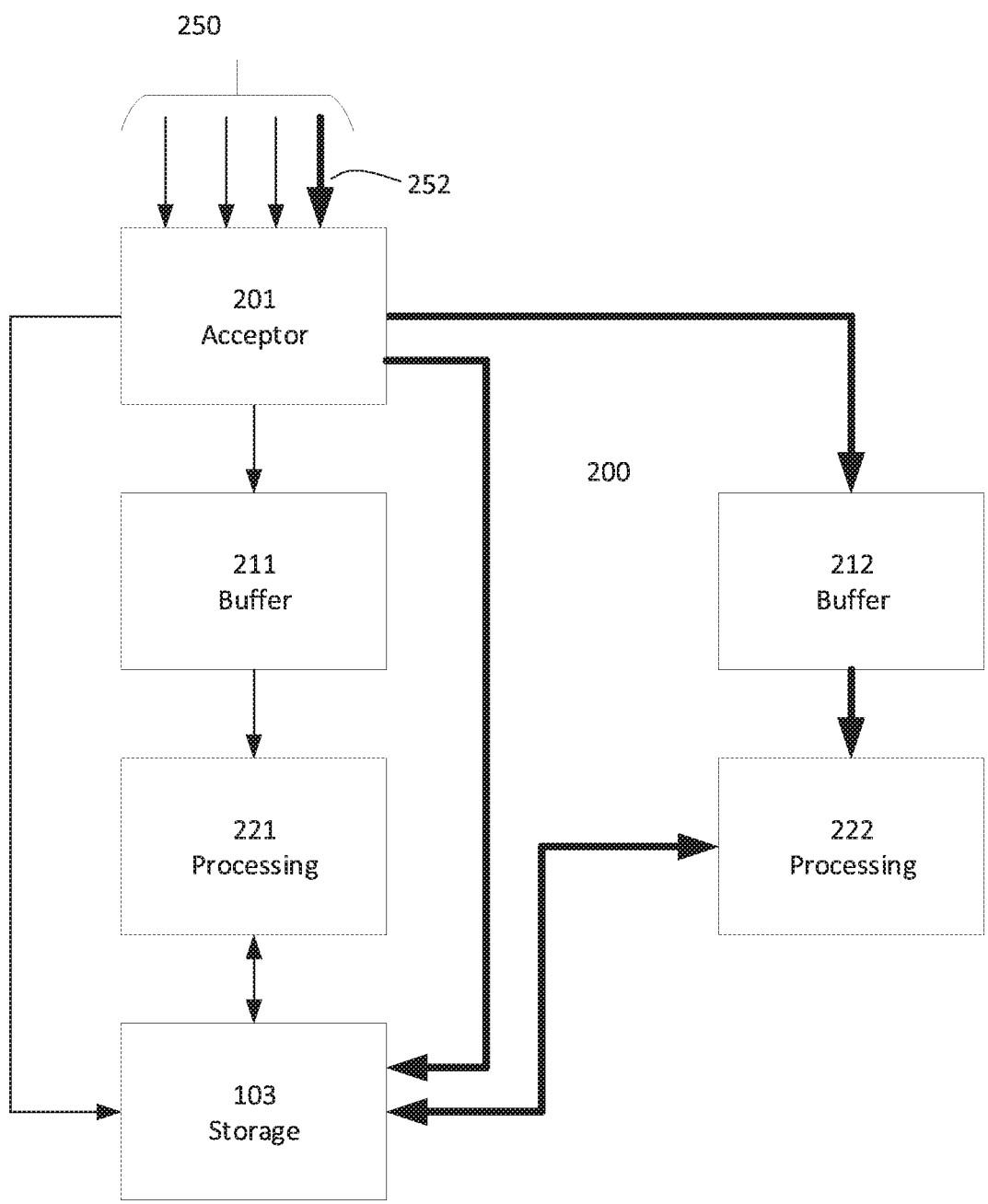
FIG. 2 is a schematic block diagram of an exemplary stream processing dataflow, according to some embodiments of the present invention.

Optionally, processor 101 executes one or more computing processes to process the plurality of streams, using a plurality of shared computer resources. Optionally, the at least one other hardware processor executes the one or more computing processes. Reference is now made also to FIG. 2, showing a schematic block diagram of an exemplary stream processing dataflow 200, according to some embodiments of the present invention. In such embodiments, at least one hardware processor executes one or more computing processes to processes a plurality of streams 250. Plurality of streams 250 are input to the one or more computing processes. Optionally, the one or more computing processes comprise at least one acceptor process 201 for receiving the plurality of streams, and at least one processing process 221 for processing the plurality of streams. Optionally, the plurality of shared computer resources comprises at least one buffer 211. A buffer is a region of a digital memory storage used to temporarily store data. Optionally, at least one acceptor process 201 stores one or more digital data objects of the plurality of data streams in at least one buffer 211. Optionally, at least one processing process 221 retrieves the one or more digital data objects from at least one buffer 211 in order to process the one or more digital data objects. Optionally, at least one acceptor process 201 stores the one or more digital data objects in at least one non-volatile digital storage 103, additionally or alternatively to storing the one or more digital objects in at least one buffer 211. Optionally, at least one processing process 221 retrieves the one or more digital data objects from at least one non-volatile digital storage 103 in order to process the one or more digital data objects. Optionally, at least one processing process 221 stores the one or more digital data objects in at least one non-volatile digital storage 103 after processing the one or more digital data objects, for example after adding at least one value to at least one of the one or more digital data objects.

When one or more streams are identified as obstructing, for example one or more streams 252, a plurality of new computing processes is optionally created for processing one or more streams 252, for example at least one new processing process 222. Optionally, one or more new shared computer resources are allocated for processing one or more streams 252, for example at least one new buffer 212. Optionally, one or more streams 252 are input to the plurality of new computing processes instead of to the plurality of computing processes, while plurality of streams 250 are input to the plurality of computing processes. For example, at least one acceptor process 201 optionally stores at least one new digital data object of one or more streams 252 in at least one new buffer 212. Optionally, at least one new processing process 222 retrieves the at least one new digital data object from at least one new buffer 212 in order to process the at least one new digital data object. Optionally, at least one acceptor process 201 stores the at least one new digital data object in at least one non-volatile digital storage 103. Optionally, at least one new processing process 222 retrieves the at least one new digital data object from at least one non-volatile digital storage 103 in order to process the at least one new digital data object. Optionally, at least one new processing process 222 stores the at least one new digital data object in at least one non-volatile digital storage 103 after processing the at least one new digital data object, for example after adding at least one new value to at least one of the at least one new digital data object.

To manage the plurality of shared computer resources, in some embodiments of the present invention system 100 implements the following optional method.

Figure 3:
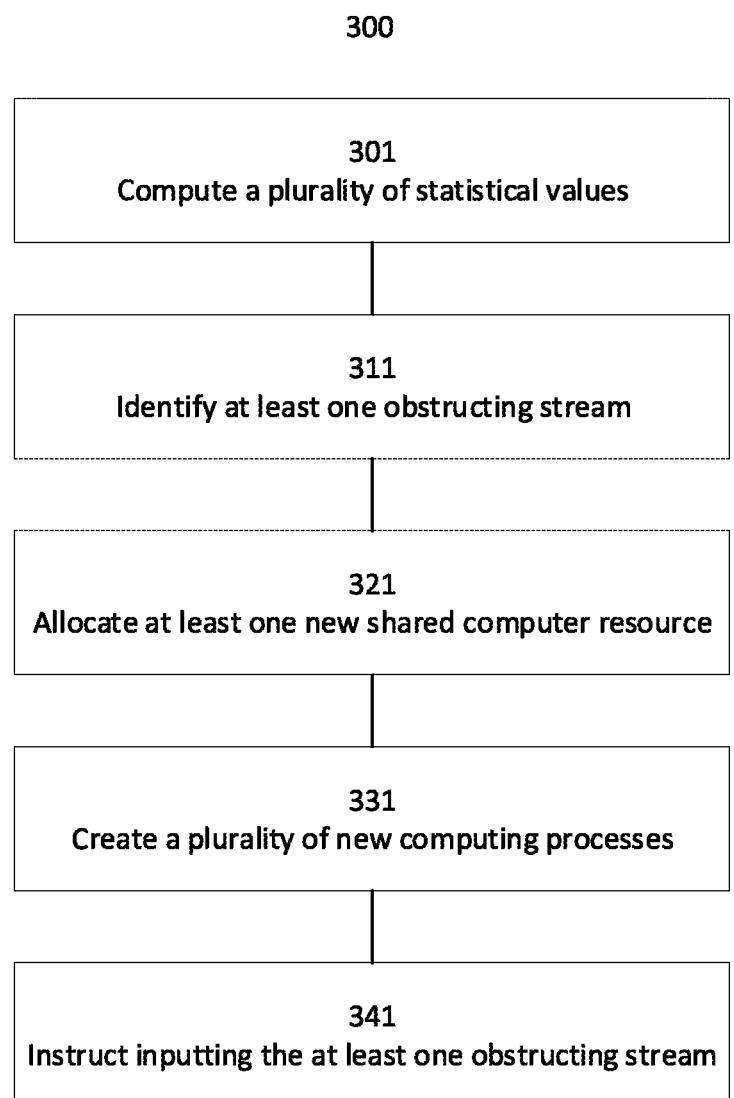
FIG. 3 is a flowchart schematically representing an optional flow of operations for managing shared computer resources, according to some embodiments of the present invention.

Reference is now made also to FIG. 3, showing a flowchart schematically representing an optional flow of operations 300 for managing shared computer resources, according to some embodiments of the present invention. In such embodiments, processor 101 executes a plurality of management iterations. In at least one of the plurality of management iterations, in 301 processor 101 optionally computes a plurality of statistical values. Optionally, each of the statistical values is associated with one of plurality of streams 250. Optionally, plurality of streams 250 are input to a plurality of computing processes, for example comprising at least one acceptor process 201 and at least one processing process 221 used for processing the plurality of streams. Optionally, the plurality of computing processes are executed using one or more of a plurality of shared computer resources, for example at least one buffer 211 and at least one non-volatile digital storage 103. Some other examples of a shared computer resource are a hardware processor, and a virtual machine. Optionally, the plurality of computing processes are executed by processor 101. Optionally, the plurality of computing processes are executed by the least one other hardware processor. Optionally, at least one of the plurality of computing processes is executed by at least one virtual machine. The virtual machine is optionally executed by the at least one other hardware processor. Optionally, the at least one other hardware processor executing the virtual machine is processor 101.

Figure 4:
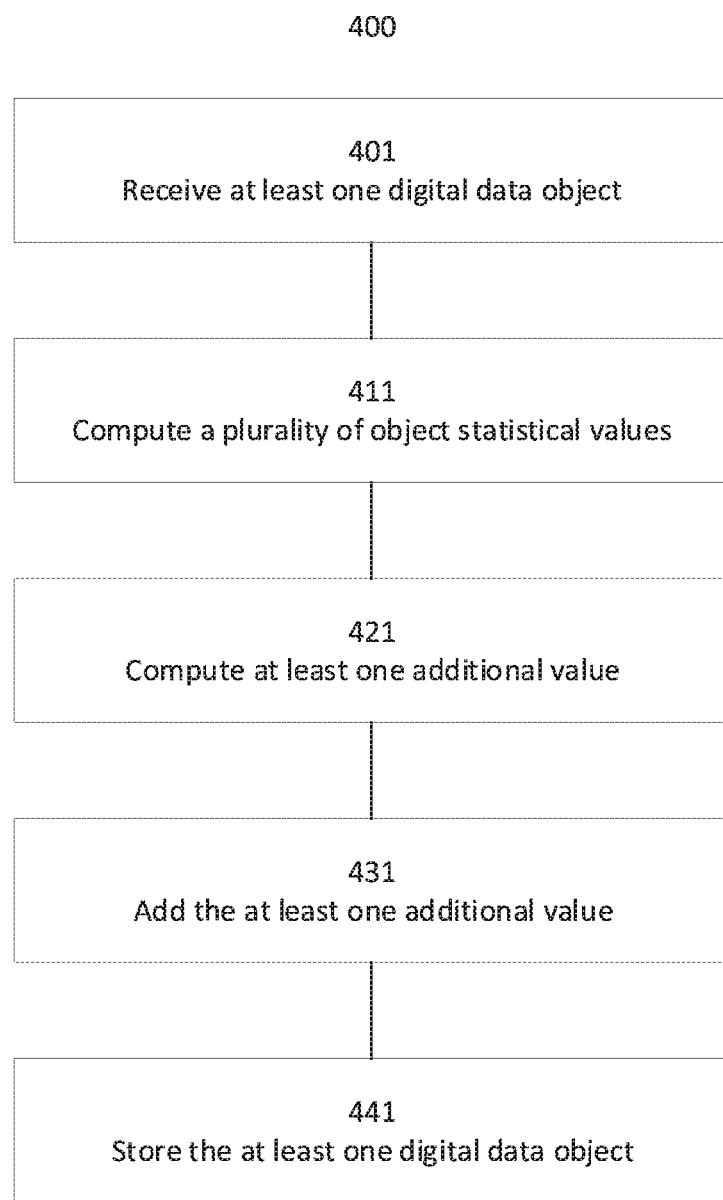
FIG. 4 is a flowchart schematically representing an optional flow of operations for processing a stream, according to some embodiments of the present invention.

Reference is now made also to FIG. 4, showing a flowchart schematically representing an optional flow of operations 400 for processing a stream, according to some embodiments of the present invention. Optionally, processing a stream comprises executing a plurality of stream iterations for each stream of the plurality of streams, optionally by processor 101. Optionally, in each of the plurality of stream iterations the processor 101 receives in 401 at least one digital data object of the respective stream. In 411, processor 101 optionally computes a plurality of object statistical values according to the at least one digital object. Optionally, in at least one of the plurality of stream iterations, processor 101 provides the plurality of object statistical values to at least one other computing process, for example to perform a data-analysis oriented task. In one example, the data-analysis oriented task computes one or more metric values about the plurality of streams. Optionally, processor 101 computes in 301 the plurality of statistical values using the plurality of object statistical values.

Optionally, in 421, processor 101 computes at least one additional value according to the plurality of values of one or more of the at least one digital data object. For example, when the at least one digital object describes a geographical location and comprises one or more coordinate values in a world coordinate system, in some embodiments of the present invention in 421 processor 101 computes a common name value indicative of the geographical location, such as a name of a city or a name of a street, according to the one or more coordinate values. In 431, the at least one hardware processor optionally adds the at least one additional values to the one or more digital data objects, and in 441 optionally stores the at least one data object on at least one non-volatile digital storage 103. Optionally, processor 101 marks the at least one data object as unprocessed prior to storing the at least one data object on at least one non-volatile digital storage.

Reference is now made again to FIG. 3. In 311, processor 101 optionally identifies, according to an analysis of the plurality of statistical values, at least one obstructing stream 252 among plurality of streams 250. Optionally, the plurality of statistical values comprises a plurality of byte-rate values, each associated with one of plurality of streams 250. Optionally, each of the plurality of byte-rate values is indicative of an amount of bytes of the respected stream received by processor 101 in an identified time interval. Some examples of a time interval are 1 second, 10 seconds, 30 seconds, and 1 minute. Optionally, analysis of the plurality of statistical values comprises identifying a noisy stream, having an identified increase in an amount of bytes of the stream received by system 100 in an identified amount of time, as at least one obstructing stream 252.

Figure 5:
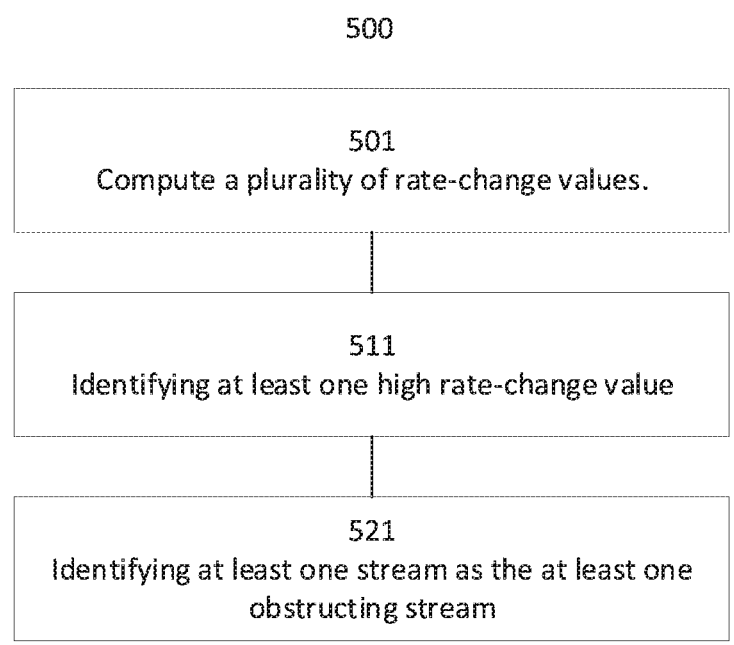
FIG. 5 is a flowchart schematically representing an optional flow of operations for identifying a noisy stream, according to some embodiments of the present invention.

Reference is now made also to FIG. 5, showing a flowchart schematically representing an optional flow of operations 500 for identifying a noisy stream, according to some embodiments of the present invention. Optionally, in 501 processor 101 computes a plurality of rate-change values, each associated with one of plurality of streams 250. Optionally, to compute one of the plurality of rate-change values, associated with one of the plurality of streams, processor 101 divides the byte-rate value of the plurality of byte-rate values, of the respective stream, by a previous byte-rate value of the respective stream, computed in a previous iteration of the plurality of management iterations. Optionally, the plurality of statistical values comprises a plurality of latency values, each indicative of an amount of time between a receive time of receiving a data object of one of plurality of streams 250 and a completion time of completing processing the data object by the plurality of computing processes. Optionally, each of the plurality of latency values is associated with one of plurality of streams 250. Optionally, processor 101 computes the plurality of rate-change values after identifying in the plurality of latency values at least one latency value exceeding an identified latency threshold value, for example 500 milliseconds, 1 second, 1.5 seconds and 5 seconds. In 511, processor 101 optionally identifies at least one high rate-change value of the plurality of rate-change values, each greater than an identified rate-change threshold value. Some examples of a rate-change threshold value are 1.05, 1.1, 1.2, 1.3, 1.4, 1.5, 1.85, 2.0, and 2.05. Optionally each of the at least one high rate-change values is associated with one of plurality of streams 250, for example at least one stream 252. In 521, processor 101 optionally identifies at least one stream 252, associated with one of the at least one high rate-change value, as the at least one obstructing stream. Optionally, identifying at least one obstructing stream 252 is subject to identifying congestion in one or more of the computing processes or one of more of the shared computer resources. Optionally, the congestion is identified according to at least some of the plurality of statistical values computed in 301. Optionally, a smoothing function is applied to the plurality of byte rate values, for example a Gaussian function, to produce a plurality of smooth byte-rate values. Optionally, a plurality of convolution values is computed by applying a convolution function to the plurality of rate-change values and the plurality of smooth byte-rate values. Optionally, processor 101 computes a priority value for each of at least one obstructing stream 252 according to the plurality of convolution values.

Reference is now made again to FIG. 3. Optionally, the plurality of statistical values comprises a plurality of processing-time values, each associated with one of plurality of streams 250. Optionally, each of the plurality of processing-time values is indicative of an amount of time the plurality of computing processes execute to process a digital object of the respective stream. Optionally, analysis of the plurality of statistical values comprises identifying a slow stream, such that an average processing-time value, indicative of an amount of time system 100 executes to process a digital data object of the slow stream, exceeds an identified processing-time threshold value, as at least one obstructing stream 252.

Figure 6:
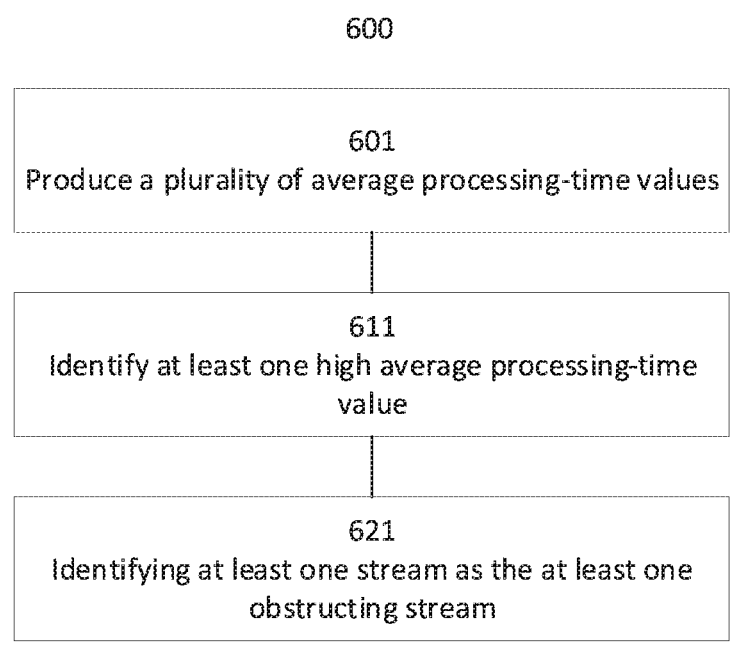
FIG. 6 is a flowchart schematically representing an optional flow of operations for identifying a slow stream, according to some embodiments of the present invention.

Reference is now made also to FIG. 6, showing a flowchart schematically representing an optional flow of operations 600 for identifying a slow stream, according to some embodiments of the present invention. In such embodiments, in 601 processor 101 computes a plurality of average processing-time values, each associated with one of plurality of streams 250. Optionally, to compute one of the plurality of average processing-time values, associated with one of the plurality of streams, processor 101 computes an average of some of the plurality of processing-time values, each associated with respective stream. In 611, processor 101 optionally identifies at least one high average processing-time value of the plurality of average processing-time values, each greater than an identified processing-time threshold value. Some examples of a processing-time threshold value are 500 microseconds, 3 milliseconds, 100 milliseconds, 500 milliseconds, 750 milliseconds, and 1 second. Optionally, the some of the plurality of processing-time values are each associated with one or more streams of the plurality of streams processed by an identified set of computation processes of the plurality of computation processes. Optionally each of the at least one high average processing-time values is associated with one of plurality of streams 250, for example at least one stream 252. In 621, processor 101 optionally identifies at least one stream 252, associated with one of the at least one average processing-time value, as the at least one obstructing stream. Optionally, identifying at least one obstructing stream 252 is subject to identifying congestion in one or more of the computing processes or one of more of the shared computer resources.

Reference is now made again to FIG. 3. In 321, processor 101 optionally allocates at least one new shared computer resource, for example at least one new buffer 212, to process at least one obstructing stream 252. In 331, processor 101 optionally creates a plurality of new computing processes, for example at least one new processing process 222, which execute using the at least one new shared computer resources. For example, at least one processing process 222 may read one or more digital data objects of at least one obstructing stream 252 from at least one new buffer 212. In 341, processor 101 optionally instructs inputting at least one obstructing stream 252 to the plurality of new computing processes instead of to the plurality of computing processes. Optionally, at least one obstructing stream 252 is inputted to the plurality of new computing processes while the plurality of streams are inputted to the plurality of computing resources, for example by instructing at least one acceptor process 201 to store one or more data objects of at least one obstructing stream 252 in at least one new buffer 212 instead of in as least one buffer 211, while storing a plurality of data objects of other streams of plurality of stream 250 in at least one buffer 211. Optionally, instructing inputting at least one obstructing stream 252 to the plurality of new computer resources comprises instructing the plurality of new computing processes to retrieve the one or more data objects of at least one obstructing stream 252 from at least one non-volatile digital storage 103. Optionally, processor 101 marks the one or more data objects of at least one obstructing stream 252 as unprocessed prior to storing the one or more data objects in at least one non-volatile digital storage 103.

Plurality of streams 250 may comprise more than one obstructing stream. Optionally, in each of the at least one of the plurality of management iterations, plurality of streams 250 consists of no more than an identified threshold amount of obstructing streams.

Processor 101 may input another obstructing stream to the plurality of new computing processes instead of to the plurality of computing processes. To do so, in some embodiments of the present invention system 100 further implements the following optional method.

Figure 7:
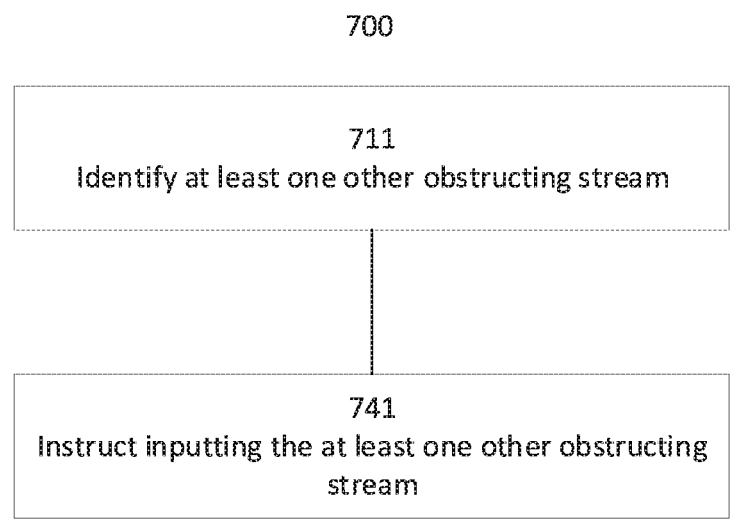
FIG. 7 is a flowchart schematically representing an optional flow of operations for redirecting another stream, according to some embodiments of the present invention.

Reference is now made also to FIG. 7, showing a flowchart schematically representing an optional flow of operations 700 for redirecting another stream, according to some embodiments of the present invention. In such embodiments, in at least one other of the plurality of management iterations, in 711 processor 101 identifies according to the analysis of the plurality of statistical values at least one other obstructing stream among plurality of streams 250. The at least one other obstructing stream may be a noisy stream. Optionally, the at least one other obstructing stream is a slow stream. Optionally, the at least one other obstructing stream is both a noisy stream and a slow stream. In 741, processor 101 optionally instructs inputting the at least one other obstructing stream to the plurality of new computing processes instead of to the plurality of computing processes, for example by instructing at least one acceptor process 201 to store one or more other data objects of the at least one other obstructing stream in at least one new buffer 212 instead of in as least one buffer 211, while storing the plurality of data objects of other streams of plurality of stream 250 in at least one buffer 211. Optionally, when at least one obstructive stream 252 is a noisy stream the at least one other obstructing stream is another noisy stream. Optionally, when at least one obstructive stream 252 is a slow stream the at least one other obstructing stream is another slow stream.

In addition or alternatively, processor 101 may input the other obstructing stream to a plurality of other new computing processes instead of to the plurality of computing processes or to the plurality of new computing processes. To do so, in some embodiments of the present invention system 100 further implements the following optional method.

Figure 8:
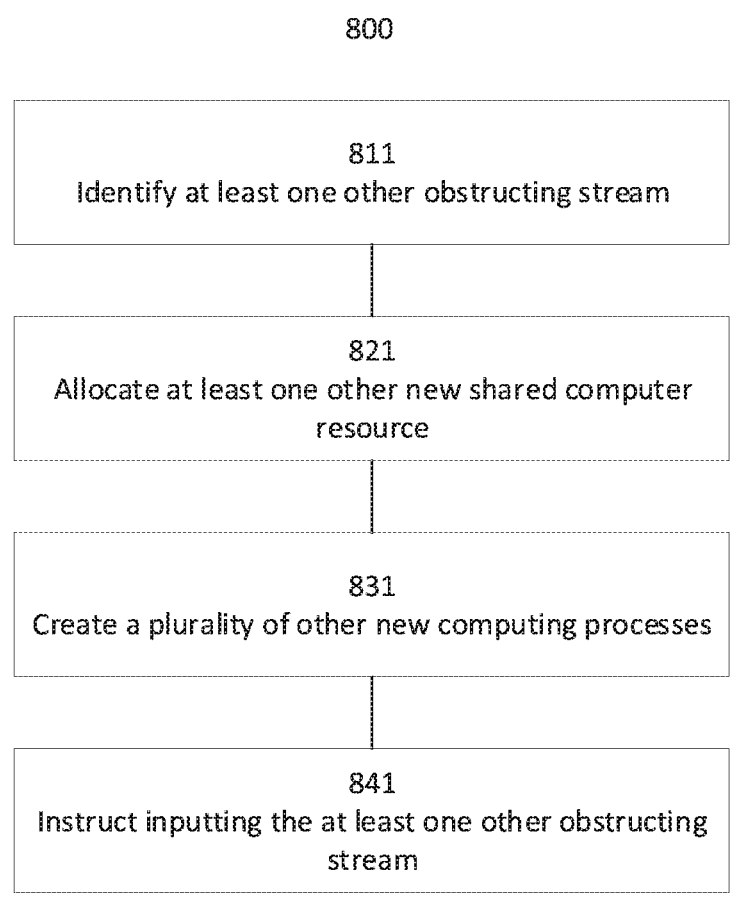
FIG. 8 is a flowchart schematically representing another optional flow of operations for redirecting another stream, according to some embodiments of the present invention.

Reference is now made also to FIG. 8, showing a flowchart schematically representing another optional flow of operations 800 for redirecting another stream, according to some embodiments of the present invention. In such embodiments, in the at least one other of the plurality of management iterations, in 811 processor 101 identifies according to the analysis of the plurality of statistical values the at least one other obstructing stream among plurality of streams 250. In 821, processor 101 optionally allocates at least one other new shared computer resource to process the at least one other obstructing stream, for example another new buffer or another new virtual machine. In 831, processor 101 optionally creates a plurality of other new computing processes which execute using the at least one other new shared computer resource, for example, another new processing process that reads data from the other new buffer, or another new processing process executed by the other new virtual machine. In 841, processor 101 optionally instructs inputting the at least one other obstructing stream to the plurality of other new computing processes instead of to the plurality of computing processes or to the plurality of new computing processes, while inputting other of plurality of streams 252 to the plurality of computing processes. Optionally, when at least one obstructive stream 252 is a noisy stream the at least one other obstructing stream is a slow stream. Optionally, when at least one obstructive stream 252 is a slow stream the at least one other obstructing stream is a noisy stream.

It may be that over time a stream that was identified as an obstructing stream ceases to be obstructing and may not require computing processes and shared computer resources separate from the plurality of computing processes and the plurality of shared computer resources. In some embodiments, in at least one additional iteration of the plurality of management iterations, processor 101 identifies that at least one obstructing stream 252 is no longer obstructing and instructs inputting at least one obstructing stream 252 to the plurality of computing processes instead of to the plurality of new computing processes, while plurality of streams 250 are inputted to the plurality of computing processes.

For example, in some embodiments where at least one obstructing stream 252 is a noisy stream, system 100 optionally implements the following method.

Figure 9:
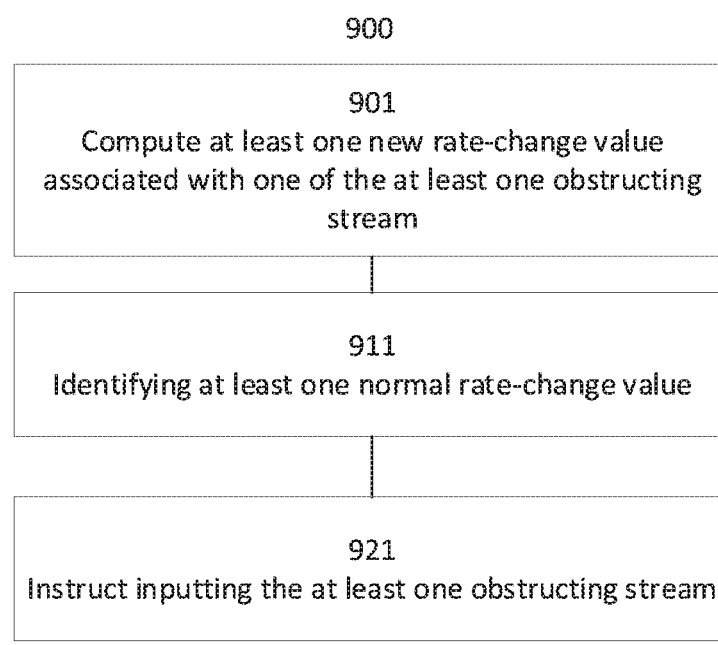
FIG. 9 is a flowchart schematically representing an optional flow of operations for identifying a no longer noisy stream, according to some embodiments of the present invention.

Reference is now made also to FIG. 9, showing a flowchart schematically representing an optional flow of operations 900 for identifying a no longer noisy stream, according to some embodiments of the present invention. In such embodiments, in the at least one additional iteration of the plurality of management iterations, in 901 processor 101 computes at least one new rate-change value, each associated with one of at least one obstructing stream 252. Optionally, to compute one of the at least one new rate-change values, associated with one of at least one obstructing stream 252, processor 101 divides the byte-rate value of the plurality of byte-rate values, of the respective stream, by another previous byte-rate value of the respective stream, computed in another previous iteration of the plurality of management iterations. In 911, processor 101 optionally identifies at least one normal rate-change value of the at least one new rate-change values, each less than the identified rate-change threshold value. Optionally, each of the least one new rate-change values is less than another identified rate change threshold value. Some other examples of a rate-change threshold value are 0.2, 0.95, 0.99, and 1.1. Optionally each of the at least one normal rate-change values is associated with at least one obstructing stream 252. In 921, processor 101 optionally instructs inputting at least one obstructing stream 252 to the plurality of computing processes instead of the plurality of new computing processes while inputting plurality of streams 250 to the plurality of computing resources. Optionally, instructs inputting at least one obstructing stream 252 to the plurality of computing processes is subject to identifying no-congestion in one or more of the computing processes or one of more of the shared computer resources. Optionally, the no-congestion is identified according to at least some of the plurality of statistical values computed in 301.

Additionally or alternatively, in some embodiments where at least one obstructing stream 252 is a slow stream, system 100 optionally implements the following method.

Figure 10:
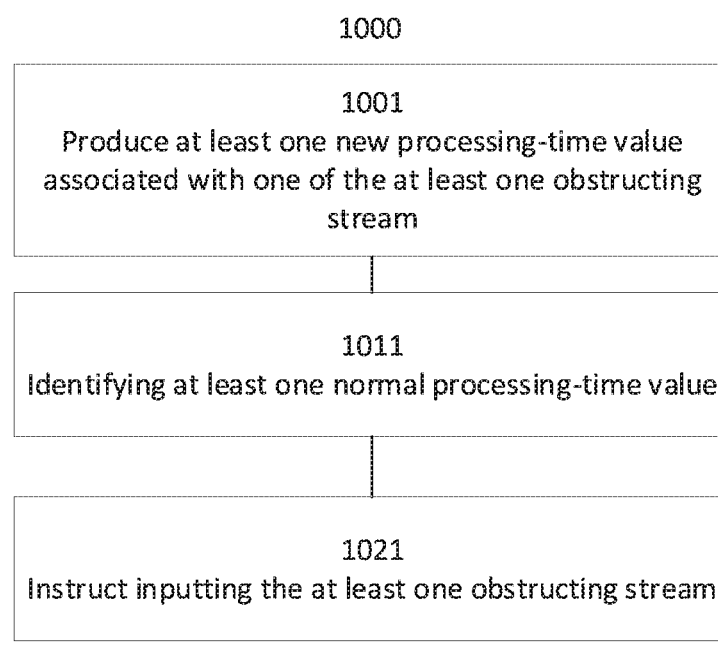
FIG. 10 is a flowchart schematically representing an optional flow of operations for identifying a no longer slow stream, according to some embodiments of the present invention.

Reference is now made also to FIG. 10, showing a flowchart schematically representing an optional flow of operations 1000 for identifying a no longer slow stream, according to some embodiments of the present invention. In such embodiments, in the at least one additional iteration of the plurality of management iterations, in 1001 processor 101 produces at least one new average processing-time value, each associated with one of at least one obstructing stream 252. Optionally, to produce one of the at least one new average processing-time values, associated with one of at least one obstructing stream 252, processor 101 computes another average of some other of the plurality of processing-time values, each associated with the respective stream. In 1011, processor 101 optionally identifies at least one normal average processing-time value of the at least one new average processing-time values, each less than the identified average processing-time threshold value. Optionally, each of the least one new average processing-time threshold values is less than another identified average processing-time threshold value. Optionally each of the at least one normal average processing-time values is associated with at least one obstructing stream 252. In 1021, processor 101 optionally instructs inputting at least one obstructing stream 252 to the plurality of computing processes instead of the plurality of new computing processes while inputting plurality of streams 250 to the plurality of computing resources. Optionally, instructs inputting at least one obstructing stream 252 to the plurality of computing processes is subject to identifying no-congestion in one or more of the computing processes or one of more of the shared computer resources.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant shared computer resources will be developed and the scope of the term "shared computer resources" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for managing a plurality of shared computer resources, comprising at least one hardware processor adapted for:
    in at least one of a plurality of management iterations:
        computing a plurality of statistical values each associated with one of a plurality of streams, where the streams are input to a plurality of computing processes which are used for processing the plurality of streams, executed using at least one of a plurality of shared computer resources, said plurality of statistical values are indicative of at least one of a byte-rate and processing-time of a respective one of the plurality of streams;
        identifying according to an analysis of the plurality of statistical values at least one obstructing stream among the plurality of streams;
        isolating a processing of the identified at least one obstructing stream from the processing of the plurality of streams, by allocating at least one new shared computer resource to process the at least one obstructing stream and by diverting said processing of the identified at least one obstructing stream to said allocated at least one new shared computer resource;
        creating a plurality of new computing processes which execute using the at least one new shared computer resource; and
        instructing inputting the at least one obstructing stream to the plurality of new computing processes instead of to the plurality of computing processes while the plurality of streams are inputted to the plurality of computing processes.

2. The system of claim 1, wherein each of the plurality of streams comprises a plurality of log entries.

3. The system of claim 1, wherein at least one of the plurality of shared computer resources is selected from a group of computer resources consisting of: a virtual machine, digital memory, and a non-volatile digital storage; and
    wherein at least one of the new shared computer resources is selected from the group of computer resources.

4. The system of claim 1, wherein at least one of the plurality of computing processes is executed by at least one virtual machine executing on at least one other hardware processor.

5. The system of claim 1, wherein each of the plurality of streams comprises a plurality of digital data objects, each digital data object comprising a plurality of values; and
    wherein processing the plurality of streams comprises for each of the plurality of streams:

in each of a plurality of stream iterations:
receiving at least one digital data object of the respective stream;
computing a plurality of object statistical values according to the at least one digital data object;
computing at least one additional value according to the plurality of values of one or more of the at least one digital data object; and
adding the at least one additional value to the one or more digital data objects.

6. The system of claim 5, wherein processing the plurality of streams further comprises for each of the plurality of streams, in at least one of the plurality of stream iterations, providing the plurality of object statistical values to at least one other computing process to perform a data-analysis oriented task.

7. The system of claim 6, wherein the at least one hardware processor is adapted to computing the plurality of statistical values using the plurality of object statistical values.

8. The system of claim 5, wherein processing the plurality of streams further comprises for each of the plurality of streams, in each of the plurality of stream iterations, storing the at least one digital data object on at least one non-volatile digital storage connected to the at least one hardware processor.

9. The system of claim 1, wherein the plurality of shared computer resources comprises at least one buffer, such that at least one acceptor process of the plurality of computing processes stores the plurality of streams in the at least one buffer, and at least one processing process of the plurality of computing processes reads the plurality of streams from the at least one buffer; and
wherein the plurality of new shared computer resources comprises at least one new buffer, such that the at least one acceptor process stores the at least one obstructing stream in the at least one new buffer, and at least one new processing process of the plurality of new computing processes reads the at least one obstructing stream from the at least one new buffer.

10. The system of claim 1, wherein the at least one hardware processor is further adapted for:
in at least one other of the plurality of management iterations:
identifying according to the analysis of the plurality of statistical values at least one other obstructing stream among the plurality of streams;
isolating a processing of the identified at least one other obstructing stream from the processing of the plurality of streams, by diverting said processing of the identified at least one other obstructing stream to said at least one new shared computer resource; and
instructing inputting the at least one other obstructing stream to the plurality of new computing processes instead of to the plurality of computing processes while the plurality of streams are inputted to the plurality of computing processes.

11. The system of claim 1, wherein the at least one hardware processor is further adapted for:
in at least one other of the plurality of management iterations:
identifying according to an analysis of the plurality of statistical values at least one other obstructing stream among the plurality of streams;
isolating a processing of the identified at least one other obstructing stream from the processing of the plurality of streams and from the processing of said at least one obstructing stream, by allocating at least one other new shared computer resource to process the at least one other obstructing stream and by diverting said processing of the identified at least one other obstructing stream to said allocated at least one other new shared computer resource;
creating a plurality of other new computing processes which execute using the at least one other new shared computer resource; and
instructing inputting the at least one other obstructing stream to the plurality of other new computing processes instead of to the plurality of computing processes while the plurality of streams are inputted to the plurality of computing processes.

12. The system of claim 1, wherein the plurality of statistical values comprises a plurality of byte-rate values, each associated with one of the plurality of streams and indicative of an amount of bytes of the stream received by the at least one hardware processor in an identified time interval; and
wherein identifying according to the analysis of the plurality of statistical values at least one obstructing stream among the plurality of streams comprises:
computing a plurality of rate-change values, each associated with one of the plurality of streams, by for each of the plurality of streams dividing the byte-rate value of the respective stream by a previous byte-rate value of the respective stream computed in a previous iteration of the plurality of management iterations;
identifying at least one high rate-change value of the plurality of rate-change values, each greater than an identified rate-change threshold value; and
identifying at least one stream of the plurality of streams, each associated with one of the at least one high rate-change value, as the at least one obstructing stream.

13. The system of claim 12, wherein the at least one hardware processor is further adapted for:
in at least one additional iteration of the plurality management iterations:
computing at least one new rate-change value, each associated with one of the at least one obstructing stream, by for each of the at least one obstructing stream dividing the byte-rate value of the respective stream by another previous byte-rate value of the respective stream computed in another previous iteration of the plurality of management iterations;
identifying at least one normal rate-change value of the at least one new rate-change value, each less than the identified rate-change threshold value; and
instructing inputting the at least one obstructing stream to the plurality of computing processes instead of to the plurality of new computing processes while the plurality of streams are inputted to the plurality of computing processes.

14. The system of claim 1, wherein each of the plurality of streams comprises a plurality of digital data objects;
wherein the plurality of statistical values comprises a plurality of processing-time values, each associated with one of the plurality of streams and indicative of an amount of time the plurality of computing processes execute to process a digital data object of the stream; and
wherein identifying according to the analysis of the plurality of statistical values at least one obstructing stream among the plurality of streams comprises:

producing a plurality of average processing-time values, each associated with one of the plurality of streams, by for each of the plurality streams computing an average of some of the plurality of processing-time values, each associated with the respective stream;

identifying at least one high average processing-time value of the plurality of average processing-time values, each greater than an identified processing-time threshold value; and identifying at least one stream of the plurality of streams, each associated with one of the at least one high average processing-time value, as the at least one obstructing stream.

15. The system of claim 14, wherein the at least one hardware processor is further adapted for in each of a plurality of stream iterations:

receiving at least one digital data object of the obstructing stream;

marking the at least one digital data object as unprocessed; and storing the marked at least one digital data object in at least one non-volatile digital storage connected to the at least one hardware processor; and wherein instructing inputting the at least one obstructing stream to the plurality of new computing processes comprises instructing the plurality of new computing processes to retrieve the marked at least one digital data objects from the at least one non-volatile digital storage.

16. The system of claim 14, wherein the at least one hardware processor is further adapted for:

in at least one additional iteration of the plurality management iterations:

producing at least one new average processing-time value, each associated with one of the at least one obstructing stream, by for each of the at least one obstructing stream computing another average of some other of the plurality of processing-time values, each associated with the respective stream;

identifying at least one normal average processing-time value of the at least one new average processing-time value, each less than the identified processing-time threshold value; and instructing inputting the at least one obstructing stream to the plurality of computing processes instead of to the plurality of new computing processes while the plurality of streams are inputted to the plurality of computing processes.

17. The system of claim 1, wherein the plurality of statistical values comprises a plurality of latency values, each indicative of an amount of time between a receive time of receiving a data object of a respective one of the plurality of streams and a completion time of completing processing the data object.

18. The system of claim 17, wherein said at least one hardware processor is further adapted for computing a plurality of byte-rate change values after identifying in the plurality of the plurality of latency values at least one latency value exceeding an identified latency threshold value.

19. The system of claim 1, wherein said plurality of statistical values comprises a plurality of byte-rate values and wherein said at least one hardware processor is further adapted to apply a smoothing function to said plurality of byte-rate values to produce a plurality of smooth byte-rate values.

20. The system of claim 19, wherein said at least one hardware processor is further adapted to compute a plurality of convolution values based on applying a convolution function to a plurality of rate-change values calculated from said plurality of byte-rate values, and the plurality of smooth byte-rate values, and is further adapted to compute a priority value for each of the at least one obstructing stream according to the plurality of convolution values.

21. A method for managing a plurality of shared computer resources, comprising:

in at least one of a plurality of management iterations:

computing a plurality of statistical values each associated with one of a plurality of streams, where the streams are input to a plurality of computing processes which are used for processing the plurality of streams, executed by at least one hardware processor using at least one of a plurality of shared computer resources said plurality of statistical values are indicative of at least one of a byte-rate and processing-time of a respective one of the plurality of streams;

identifying according to an analysis of the plurality of statistical values at least one obstructing stream among the plurality of streams;

isolating a processing of the identified at least one obstructing stream from the processing of the plurality of streams, by allocating at least one new shared computer resource to process the at least one obstructing stream and by diverting said processing of the identified at least one obstructing stream to said allocated at least one new shared computer resource;

creating a plurality of new computing processes which execute on the at least one hardware processor using the at least one new shared computer resource; and instructing inputting the at least one obstructing stream to the plurality of new computing processes instead of to the plurality of computing processes while the plurality of streams are inputted to the plurality of computing processes.

22. A system for processing a plurality of streams, each comprising a sequence of log entries, comprising at least one hardware processor adapted for:

in each of a plurality of stream iterations:

receiving at least one log entry of a stream of the plurality of streams;

inputting the at least one log entry to a plurality of computing processes executed using a plurality of shared computer resources managed by in at least one of a plurality of management iterations:

computing a plurality of statistical values each associated with one of the plurality of streams, where the streams are input to a plurality of computing processes which are used for processing the plurality of streams, executed by the at least one hardware processor using at least one of the plurality of shared computer resources, said plurality of statistical values are indicative of at least one of a byte-rate and processing-time of a respective one of the plurality of streams;

identifying according to an analysis of the plurality of statistical values at least one obstructing stream among the plurality of streams;

isolating a processing of the identified at least one obstructing stream from the processing of the plurality of streams, by allocating at least one new shared computer resource to process the at least one obstructing stream and by diverting said processing of the identified at least one obstructing stream to said allocated at least one new shared computer resource;

creating a plurality of new computing processes which execute on the at least one hardware processor using the at least one new shared computer resource; and instructing inputting the at least one obstructing stream to the plurality of new computing processes instead of to the plurality of computing processes while the plurality of streams are inputted to the plurality of computing processes; and providing an output of the computing processes to at least one other hardware processor to perform a log-analysis task.

\* \* \* \* \*